United States Patent
Kim

(10) Patent No.: US 9,614,893 B2
(45) Date of Patent: Apr. 4, 2017

(54) METHOD, APPARATUS AND SYSTEM FOR AUTO-SYNCHRONIZATION OF COMPRESSED CONTENT FILES

(71) Applicant: Samsung Electronics Co. Ltd., Suwon-si, Gyeonggi-do (KR)

(72) Inventor: Yongsu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 466 days.

(21) Appl. No.: 13/965,927

(22) Filed: Aug. 13, 2013

(65) Prior Publication Data

US 2014/0059165 A1 Feb. 27, 2014

(30) Foreign Application Priority Data

Aug. 24, 2012 (KR) .................. 10-2012-0093281

(51) Int. Cl.
  *G06F 15/16* (2006.01)
  *H04L 29/08* (2006.01)
  *G06F 17/30* (2006.01)
(52) U.S. Cl.
  CPC ........ *H04L 67/06* (2013.01); *G06F 17/30165* (2013.01)
(58) Field of Classification Search
  USPC .............. 1/1; 707/640, 661, 693; 717/101; 705/1.1, 2; 709/200
  See application file for complete search history.

(56) References Cited

U.S. PATENT DOCUMENTS

| | | | |
|---|---|---|---|
| 5,802,520 A * | 9/1998 | Jerkunica | G06F 17/30067 |
| 5,956,724 A * | 9/1999 | Griffiths | H03M 7/3088 |
| 6,405,219 B2 | 6/2002 | Saether et al. | |
| 7,562,345 B2 * | 7/2009 | Bogdan | G06F 8/20 717/101 |
| 7,987,162 B2 * | 7/2011 | Aston | G06F 17/30153 707/693 |
| 8,024,382 B2 * | 9/2011 | Evans | G06F 17/30073 707/661 |
| 8,219,526 B2 | 7/2012 | Clarke et al. | |

(Continued)

FOREIGN PATENT DOCUMENTS

KR  10-2002-0072804 A  9/2002

*Primary Examiner* — Quang N Nguyen
(74) *Attorney, Agent, or Firm* — Jefferson IP Law, LLP

(57) ABSTRACT

An auto-synchronization method, apparatus, and system for synchronizing compressed content file automatically in such a way of tracing the modification history of source files of the compressed content file and synchronizing the modified source files selectively are provided. The portable device includes a radio communication unit configured to connect to the synchronization server to transmit and receive data related to the compressed content file, a storage unit configured to store at least one of the compressed content file, compressed content file information, and source file information related to source files constituting the compressed content file, and a control unit configured to detect a synchronization request signal generated by an event modifying the compressed content file, extract at least one modified first source file from the compressed content file based on the source file information, and synchronize the extracted first source file with a second source file matching among source files stored in a synchronization server.

16 Claims, 10 Drawing Sheets

(56) References Cited

U.S. PATENT DOCUMENTS

| | | | | |
|---|---|---|---|---|
| 8,583,602 B2* | 11/2013 | Welingkar | .......... | H04L 67/1095 |
| | | | | 707/640 |
| 8,868,435 B2* | 10/2014 | Johnson | ............ | G06F 17/30864 |
| | | | | 705/1.1 |
| 9,170,804 B2* | 10/2015 | Schillinger | ............... | G06F 8/68 |
| 2004/0054676 A1* | 3/2004 | McNally | ........... | G06F 17/30719 |
| 2004/0068523 A1* | 4/2004 | Keith, Jr. | .......... | G06F 17/30176 |
| 2005/0273486 A1* | 12/2005 | Keith | ...................... | G06F 21/10 |
| | | | | 709/200 |
| 2007/0067362 A1* | 3/2007 | McArdle | ........... | G06F 17/30073 |
| 2010/0082364 A1* | 4/2010 | Taub | ..................... | G06Q 50/22 |
| | | | | 705/2 |

\* cited by examiner

| _id | Path | name | Sync1 | ... |
|---|---|---|---|---|
| 1 | Magazine.snb | Magazine | Unique_key | ... |
|  |  |  |  | ... |
|  |  |  |  | ... |

<902>

| snb_id | Path | checksum | ... |
|---|---|---|---|
| 1 | [Content_Types].xml | MD5 based chksum | ... |
| 1 | _rels/.rels | MD5 based chksum | ... |
| 1 | docProps/app.xml | MD5 based chksum | ... |
| 1 | docProps/core.xml | MD5 based chksum | ... |
| 1 | docProps/custom.xml | MD5 based chksum | ... |
| 1 | snote/_rels/master.xml.rels | MD5 based chksum | ... |
| 1 | snote/_rels/snote.xml.rels | MD5 based chksum | ... |
| 1 | snote/media/image1.png | MD5 based chksum | ... |
| 1 | snote/media/image2.png | MD5 based chksum | ... |
| 1 | snote/media/image3.png | MD5 based chksum | ... |
| 1 | snote/media/snb_thumbnailimage_001.jpg | MD5 based chksum | ... |
| 1 | snote/media/snb_thumbnailimage_002.jpg | MD5 based chksum | ... |
| 1 | snote/font.xml | MD5 based chksum | ... |
| 1 | snote/master.xml | MD5 based chksum | ... |
| 1 | snote/settings.xml | MD5 based chksum | ... |
| 1 | snote/snote.xml | MD5 based chksum | ... |
| 1 | snote/styles.xml | MD5 based chksum | ... |

FIG. 10

| snb_id | Path | Path | checksum |
|---|---|---|---|
| Unique_Key/ | _rels/ | .rels | |
| | docProps/ | app.xml | |
| | | core.xml | |
| | | custom.xml | |
| | snote/ | _rels/ | master.xml.rels |
| | | | snote.xml.rels |
| | | media/ | image1.png |
| | | | image2.png |
| | | | image3.png |
| | | | snb_thumbnailimage_001.jpg |
| | | | snb_thumbnailimage_002.jpg |
| | | font.xml | |
| | | master.xml | |
| | | settings.xml | |
| | | snote.xml | |
| | | styles.xml | |
| | [Content_Types].xml | | |

1010  1020  1030  1040

METHOD, APPARATUS AND SYSTEM FOR AUTO-SYNCHRONIZATION OF COMPRESSED CONTENT FILES

PRIORITY

This application claims the benefit under 35 U.S.C. §119(a) of a Korean patent application filed on Aug. 24, 2012 in the Korean Intellectual Property Office and assigned Serial No. 10-2012-0093281, the entire disclosure of which is hereby incorporated by reference.

BACKGROUND OF THE INVENTION

1. Field of the Invention

The present invention relates to a compressed content file auto-synchronization method, apparatus, and system. More particularly, the present invention relates to a method, apparatus, and system for synchronizing a compressed content file automatically in such a way of tracing the modification history of source files of the compressed content file and synchronizing the modified source files selectively.

2. Description of the Related Art

With the advance of communication technologies, portable devices such as smart phones and tablet PCs are widespread. Moreover, the portable devices are integrating various functions as well as the basic voice call and texting functions and are being diversified from the viewpoints of size, design, resolution, and user interfaces.

Recent portable devices are designed to support a cloud service for sharing contents. The cloud service allows the users to upload and download user contents such as movies, photos, music files, and documents to and from a server. The user is capable of storing the user contents safely in a cloud server, i.e., an external server, through the cloud service.

In order to mitigate a user's inconvenience when using a portable device, recent portable devices support a synchronization service. In the case of a synchronization method of the related art which performs synchronization on a compressed content file containing multiple files (e.g., open documents such as doc and hwp files), the compressed content file in itself is synchronized.

However, such a method has a drawback in that, even when the compressed content file has only been modified slightly, the entire compressed content file must be synchronized. For example, if a single image file or a text is modified in the compressed content file, synchronization must be performed on the entire compressed content file, which is large in volume. This synchronization of the entire compressed content file consumes a large amount of network resources, resulting in extra billing to the server operator and end user.

Furthermore, the method of the related art does not log the modification and thus, if the compressed content file is edited periodically and frequently, has to perform synchronization on the compressed content file frequently. That is, the synchronization method of the related art has to perform synchronization on the whole compressed content file rather than only the modified part whenever the file is modified even slightly, resulting in the unnecessary use of battery power and excessive network resource consumption.

Accordingly, there is a need for an improved apparatus and method that is capable of synchronizing a compressed content file in such a way of generating information on the source files constituting the compressed file, tracing the modifications of the source files based on the source file information, and synchronizing the modified source files.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention to provide a portable device and synchronization method thereof that is capable of synchronizing a compressed content file in such a way of generating information on the source files constituting the compressed file, tracing the modifications of the source files based on the source file information, and synchronizing the modified source files.

Another aspect of the present invention is to provide a synchronization server that is capable of synchronizing a compressed content file in such a way of storing the source files constituting the compressed content file rather than the compressed file in itself and uploading and/or downloading the only the modified source files for synchronization.

In accordance with an aspect of the present invention, a portable device for synchronizing a compressed content file containing plural source files with a synchronization server is provided. The device includes a radio communication unit configured to connect to the synchronization server to transmit and receive data related to the compressed content file, a storage unit configured to store the compressed content file, compressed content file information, source file information related to source files constituting the compressed content file, and a control unit configured to detect a synchronization request signal generated by an event modifying the compressed content file, extract at least one modified first source file from the compressed content file based on the source file information, and synchronize the extracted first source file with a second source file matching among source files stored in a synchronization server.

In accordance with another aspect of the present invention, a synchronization method of a portable device for synchronizing a compressed content file containing plural source files with a synchronization server is provided. The method includes detecting a synchronization request signal generated by an event modifying the compressed content file, extracting at least one modified first source file based on source file information related to source files constituting the compressed content file in response to the synchronization request signal, and synchronizing the extracted first source file with a second source file matching among source files stored in a synchronization server.

In accordance with still another aspect of the present invention, a synchronization system for synchronizing a compressed content file containing plural source files a synchronization server is provided. The system includes a portable device configured to store at least one of source files information related to source files constituting a compressed content file, extract modified first source files from the compressed content file based on the source file information, and synchronize the extracted first source file among the compressed content file by updating only the modified source files, and a synchronization server configured to store at least one source file constituting the compressed content file and source file information related to the source file and compressed content file information, provide the device with a list of modified second source files information, and synchronize the compressed content file by updating only the modified second source files with the first files stored in the portable device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 9 is a diagram illustrating tables summarizing source file information and compressed content file information for use in a portable device according to an exemplary embodiment of the present invention; and FIG. 10 is a diagram illustrating a table summarizing source file information of source files stored in a synchronization server according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
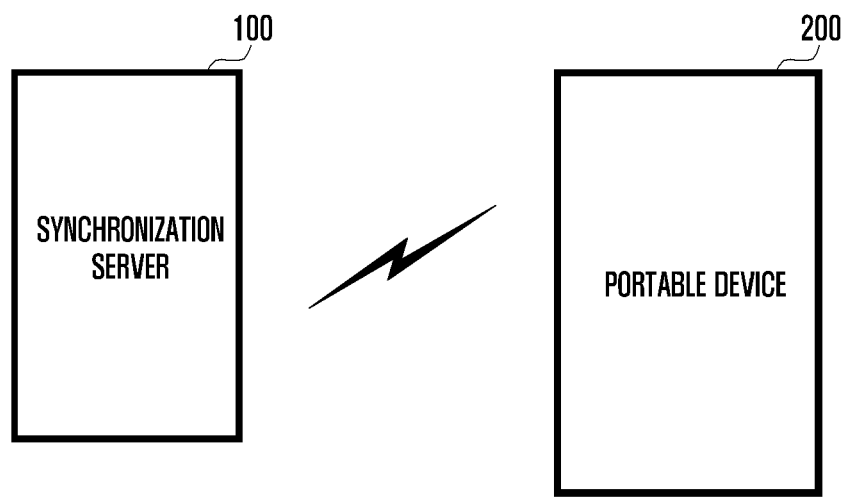
FIG. 1 is a diagram illustrating a schematic configuration of a compressed content file auto-synchronization system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the term 'compressed content file' denotes a content file containing multiple files in a compressed format (open document) that can be used as a single document. For example, the compressed content file may include ansnb file, a document file, an hwp file, etc.

In the following description, the term 'compressed content file information' denotes the metadata of the compressed content file which includes a time stamp, a file name, a file Identification (ID), a unique synchronization key, etc. In exemplary embodiments of the present invention, the compressed content file information can be classified into one of local compressed content file information stored in the portable device and server compressed content file information stored in the synchronization server.

In the following description, the term 'source file' denotes each of the source files constituting one compressed content file, and a source file can be any of an image file, a text file, an audio file, an xml file, etc.

In the following description, the term 'source file information' denotes the information on the source file and may include the identity of the compressed content file as the container of the source file, the storage path of the source file, checksum information, etc. In exemplary embodiments of the present invention, the source file information can be classified into one of local source file information stored in the portable device and server source file information stored in the synchronization server.

An exemplary synchronization method and apparatus of the present invention can be applied to a portable device. The portable device can be any of a cellular phone, a smartphone, a tablet Personal Computer (PC), a hand-held PC, a Portable Multimedia Player (PMP), a Personal Digital Assistant (PDA), etc. In the following, the description is made under the assumption that the synchronization method and apparatus is applied to a portable device. Of course, this is merely for convenience and not to be construed as limiting application of the present invention.

FIG. 1 is a diagram illustrating a schematic configuration of a compressed content file auto-synchronization system according to an exemplary embodiment of the present invention.

Referring to FIG. 1, the synchronization system includes a synchronization server 100 and at least one portable device 200. Here, the portable device 200 and the synchronization server 100 are connected to each other through a network, and the portable device 200 may connect to the network through a wired or a wireless link. Although not depicted, each of the portable device 200 and the cloud server 100 includes a network device for supporting data communication.

The synchronization server 100 allows for connection of at least one portable device 200 and content upload and download to provide a data synchronization service.

The portable device 200 is capable of performing data synchronization with the synchronization server 100 through data communication. Although the description is directed to the case where the portable device 200 performs data synchronization automatically using a time stamp, the present invention is not limited thereto. The data created, modified, or deleted in the portable device is also created, modified, or deleted in the server. And the data created, modified, or deleted in the server is also created, modified, or deleted in the portable device.

In an exemplary embodiment of the present invention, the portable device 200 and the synchronization server 100 record the time stamp per compressed content file. Here, the time stamp denotes the information indicating the most recent synchronization time of the corresponding compressed content file. The time stamp can be created along with the data or as a separate file in synchronizing the data and stored in a type of time or a certain code character.

Figure 2:
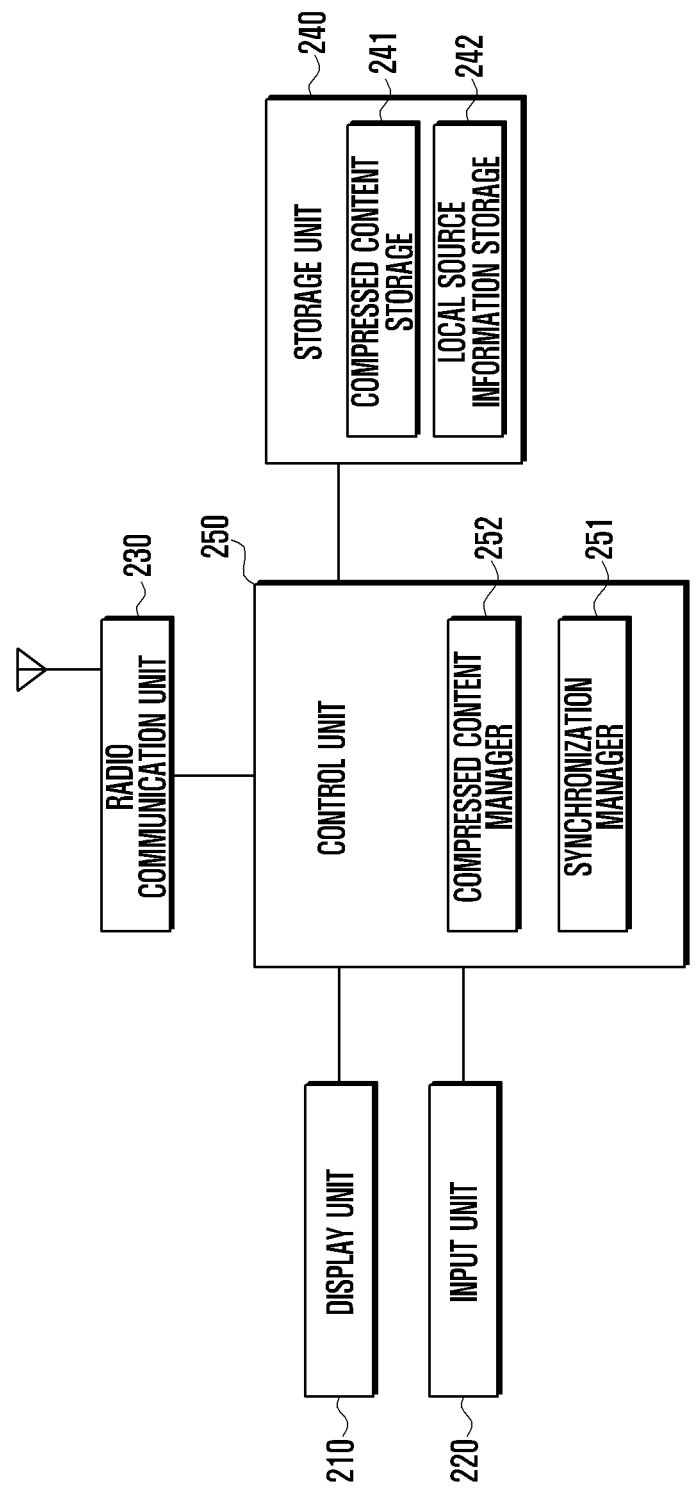
FIG. 2 is a block diagram illustrating a configuration of a portable device according to an exemplary embodiment of the present invention.

FIG. 2 is a block diagram illustrating a configuration of a portable device according to an exemplary embodiment of the present invention.

Referring to FIG. 2, the portable device includes a display unit 210, an input unit 220, a radio communication unit 230, a storage unit 240, and a control unit 250.

The display unit 210 is capable of displaying information input by the user, information to be presented to the user, and various menus. The display unit 210 is also capable of displaying various screens associated with the operations of the portable device. The display unit 210 is capable of providing an idle mode screen, a menu screen, a message composition screen, a voice call progressing screen, an audio playback screen, a video playback screen, etc.

The input unit 220 is capable of including a module for providing input to the portable device 200. The input unit 220 is capable of generating signals corresponding to user input for configuring and executing functions of the portable device 200 and entering alphanumeric characters to the control unit 250. The input unit 220 can be implemented with at least one of a touch pad, a touchscreen, a normal keypad, a qwerty keypad, and special keys for execution of special functions.

The radio communication unit 230 is capable of transmitting/receiving content data to and from an external server (e.g., a synchronization server). In an exemplary embodiment of the present invention, the radio communication unit 230 is capable of transmitting and receiving the server source file information and the server source file to and from the synchronization server under the control of the control unit 250. The radio communication unit 230 is capable of establishing a communication channel with the synchronization server under the control of the control unit 250. The radio communication unit 230 can be implemented with a communication module capable of accessing the communication environment (e.g., a network) to which the synchronization server is connected or a communication module capable of accessing another network apparatus connected to the network. The radio communication unit 230 is also capable of including a cellular communication module (e.g., 3rd Generation (3G) cellular communication module, 3.5G cellular communication module, 4G cellular communication module, etc.), a short range wireless communication module (e.g., Wi-Fi module), and a Digital Broadcast module (e.g., DMB module).

The storage unit 240 is capable of storing an Operating System (OS) of the portable device 200 and various applications (hereinafter, interchangeably referred to as app) as well as data generated in the portable device. The data may include application data generated by applications running on the portable device and received from the outside (e.g., an external server, another portable device, a personal computer, etc.). The storage unit 240 is capable of storing the configurations on the user interfaces and functions of the portable device.

In an exemplary embodiment of the present invention, the storage unit 240 is capable of including a compressed content storage 241 and a local source file information storage 242. The compressed content storage 241 is capable of storing the compressed file for use in the portable device such as ansnb file. The compressed content storage 241 is also capable of storing the metadata of the compressed content file such as a compressed content file name, a file ID, a time stamp, a synchronization ID, etc. The local source file information storage 242 is capable of storing information on the source files constituting the compressed content file such as ansnb file. Here, the source file information is capable of including the storage path and checksum information on each source file other than the source files constituting the compressed content file.

The control unit 250 is capable of controlling overall operations of the portable device and signaling among the internal components and executing the functions for processing the data. The control unit 250 is also capable of controlling power supplied from a battery to the internal components. The control unit 250 is also capable of executing the applications stored in the storage unit 240.

In an exemplary embodiment of the present invention, the control unit 250 is capable of including a synchronization manager 251 and a compressed content manager 252.

The synchronization manager 251 is capable of generating and managing a time stamp per compressed content file for synchronization with the synchronization server. If a predetermined condition is fulfilled, the synchronization manager 251 initiates synchronization with the synchronization server automatically. However, the present invention is not limited thereto.

If an event such as a modification, a deletion, or the creation of a source file in the compressed content file occurs, the synchronization manager 251 is capable of initiating synchronization with the synchronization server. Although the description is directed to the case where the synchronization manager 251 determines whether the compressed content file is modified depending on whether the time stamp information has changed, the present invention is not limited thereto. The synchronization manager 251 is also capable of receiving the server source file information from the synchronization server and compares the server source file information with the local source file information stored in the portable device to check the modification of a compressed content file. The synchronization manager 251 is also capable of determining whether the compressed content file has been modified in the portable device or the synchronization server. If the compressed content file has been modified in the portable device, the synchronization manager 251 is capable of uploading the modified source file of the compressed content file and the source file information to the synchronization server. If the compressed content file has been modified in the synchronization server, the synchronization manager 251 is capable of downloading the modified source file of the compressed content file and the source file information from the synchronization server. The compressed content file upload and download procedure is described in more detail below with reference to FIGS. 7 and 8.

In an exemplary embodiment of the present invention, the synchronization manager 251 is capable of tracing the modifications of the source files and retrieving the source files selectively. The synchronization manager 251 is capable of extracting the modified source files using the checksum algorithm included in the source file information of the source files. The checksum is an algorithm that converts a certain value input to a string of 32 characters through a unidirectional hash method which is characterized in such a way that the same input value generates the same output value.

If a compressed content file synchronization request is detected, the compressed content manager 252 extracts the source files constituting the compressed content file in the middle of a downloading and an uploading process and generates the source file information on the source files. The compressed content manager 252 is capable of decompressing and recompressing the compressed content file in the synchronization procedure with the synchronization server. In more detail, if a modification is detected in a compressed content file stored in the portable device, the compressed content manager 252 decompresses the modified compressed content file in a temporary storage to extract the corresponding source files and generates the source file information of respective source files. In the case that a specific source file is modified in the compressed content file, the compressed content manager 252 is capable of updating the modified source files and recompressing the updated source files into the compressed content file.

Although not enumerated herein, the portable device according to an exemplary embodiment of the present invention is capable of including other components such as a sensor module for detecting change of the device location, a Global Positioning System (GPS) module for determining a position of the portable device, a camera module, etc. The components of the portable device can be selectively omitted or replaced with their equivalents.

Figure 3:
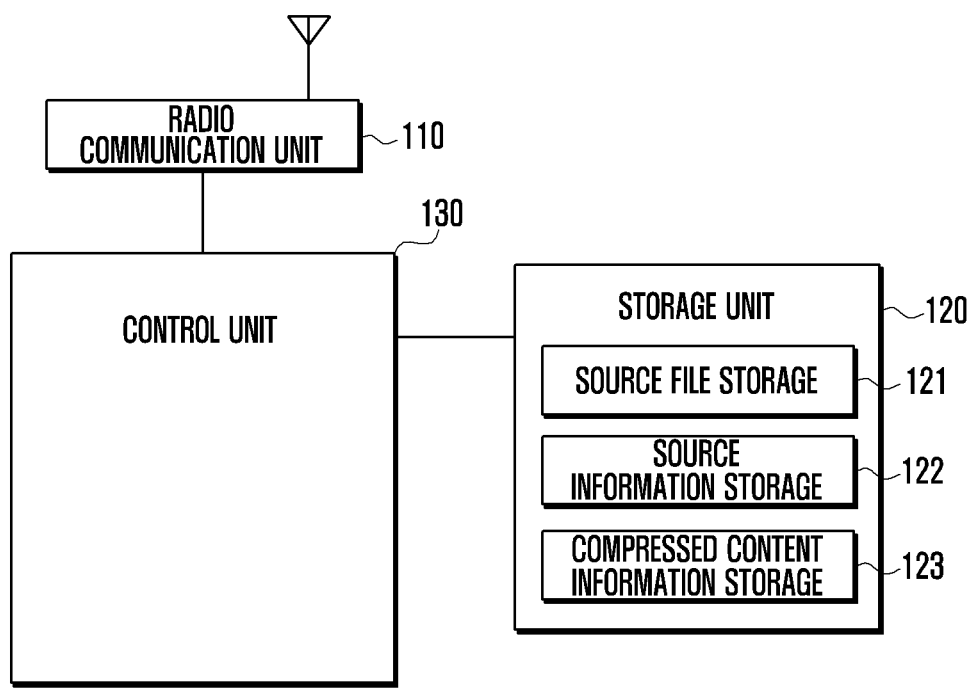
FIG. 3 is a block diagram illustrating a configuration of a synchronization server according to an exemplary embodiment of the present invention.

FIG. 3 is a block diagram illustrating a configuration of a synchronization server according to an exemplary embodiment of the present invention.

Referring to FIG. 3, the synchronization server 100 includes a radio communication unit 110, a storage unit 120, and a control unit 130.

The radio communication unit 110 is capable of transmitting and receiving content files to and from at least one portable device. In an exemplary embodiment of the present invention, the radio communication unit 110 is capable of transmitting and receiving the server source file information and source files to and from a portable device under the control of the control unit 130. The radio communication unit 110 can be implemented in the form of a communication module capable of connecting to a network or a network apparatus connected to the network.

In an exemplary embodiment of the present invention, the storage unit 120 is capable of including a source file storage 121, a source file information storage 122, and a compressed content file information storage 123. The source file storage 121 is capable of storing the source files constituting the compressed content file in distinct directories. Here, the source file can be any of various file types including an image file, a text file, an audio file, an XML file, and the like.

The source file information storage 122 is capable of storing the source file information on the respective source files constituting the compressed content file such as a snb file. Here, the source file information is capable of including path information and checksum information of the source files.

The compressed content file information storage 123 is capable of storing the compressed content file information (e.g., compressed content file name, file ID information, time stamp, unique synchronization ID, etc.).

The control unit 130 is capable of controlling such that the compressed content file is stored and managed in the form of decompressed source files rather than a whole compressed content file in itself. If there is a change in the compressed content file (e.g., a modification, a deletion, a creation of a source file, etc.), the control unit 130 is capable of initiating synchronization with the portable device. If a predetermined condition is fulfilled, the control unit 130 is capable of initiating synchronization with the portable device automatically, but not limited thereto. The control unit 130 is capable of tracing the modification of each source file and extracting the modified source files selectively. The control unit 130 is also capable of tracing the modification history of a source file and transmitting the modified source file information and the modified source file itself to the portable device.

Figure 4:
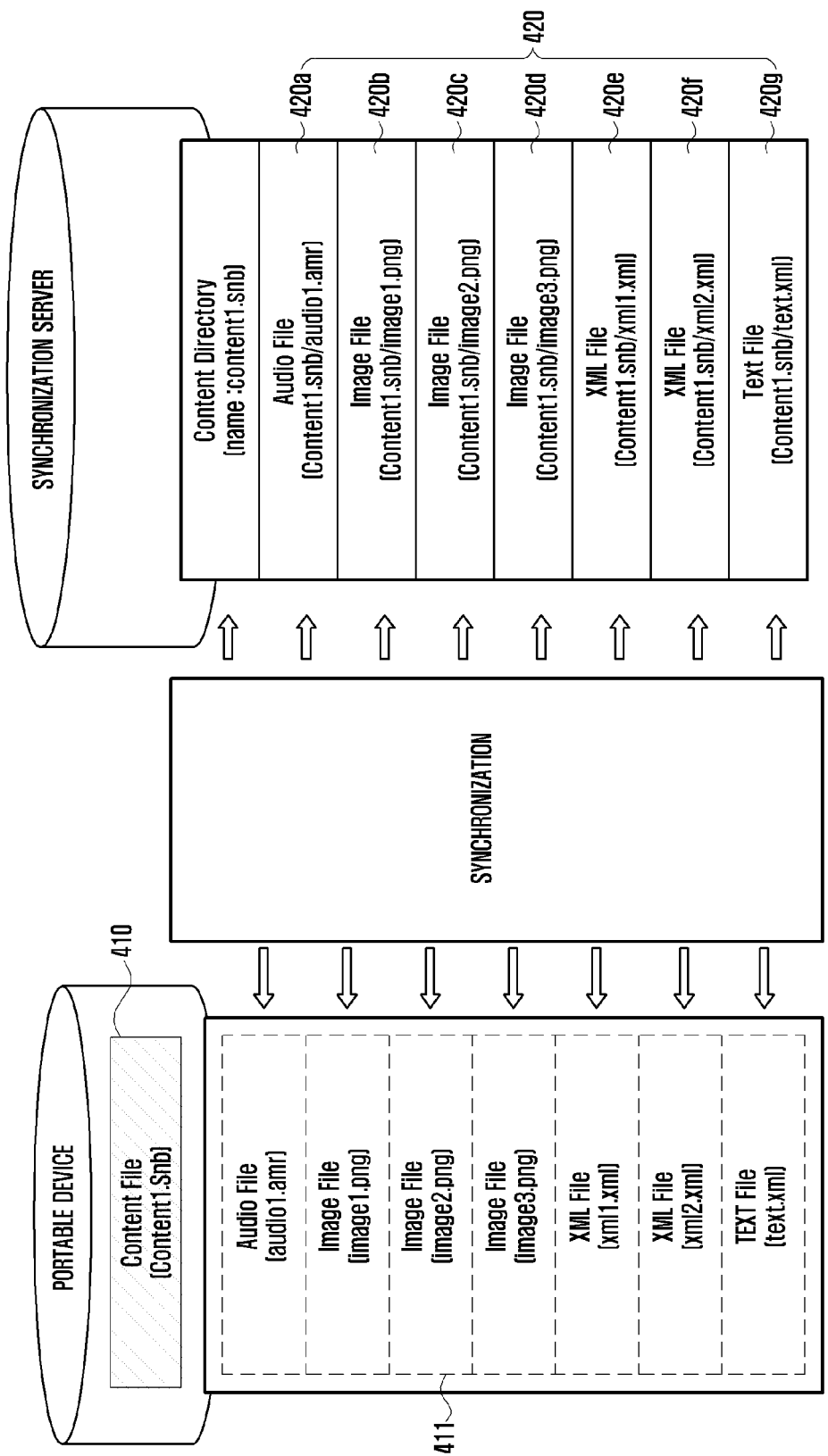
FIG. 4 is a diagram illustrating a mechanism of storing compressed content files in a portable device and a synchronization server according to an exemplary embodiment of the present invention.

FIG. 4 is a diagram illustrating a mechanism of storing compressed content files in a portable device and a synchronization server according to an exemplary embodiment of the present invention.

Referring to FIG. 4, the portable device stores the compressed content file in itself. That is, the portable device stores a compressed content file 410 with the file name of 'content1.snb'. The compressed content file 410 with the file name 'content1.snb' is consumed and managed as a single file which consists of at least one source file 411. For example, the compressed content file 'content1.snb' includes the source files 411 such as an audio file, an image file, a text file, an XML file, and the like. However, the portable device stores it as a whole compressed content file 410 rather than individual source files 411. Although the compressed content file is stored in itself, the portable device is capable of storing the source file information of the individual source files constituting the compressed content file.

Meanwhile, the synchronization server stores the compressed content file in the form of decompressed source files 420 constituting the compressed content file rather than the compressed content file in itself as a single file. For example, when storing the compressed content file with the file name 'content1.snb', the synchronization server stores the decompressed source files, i.e., an audio file 420a, image files 420b, 420c, and 420d, XML files 420e and 420f, and a text file 420g. In an exemplary embodiment of the present invention, the synchronization server is capable of storing the source files 420 in a distinct directory format based on the source path information. As depicted in the drawing, the synchronization server is capable of storing the compressed content file as decompressed source files 420 rather that the compressed content file with the file name 'content1.snb' in itself. The synchronization server is capable of generating a unique key corresponding to the content1.snb uploaded by the portable device. At this time, the synchronization server is capable of searching for the source files 420 stored in directory format with the unique identifiers.

Also, the synchronization server is capable of storing the source files along with respective source file information. The source file information is capable of including source file storage path and checksum information. Here, the source file storage path can be included in the information on the directory storing the corresponding file. For example, the first audio source file storage path can be stored in the form of 'contents/1.snb/audio1.amr'.

In exemplary embodiments of the present invention, the portable device stores the compressed content file in itself while the synchronization server stores the source files decompressed from the compressed content file. Typically, since the compressed content file is used and managed in itself, the whole compressed content file is uploaded and downloaded for use in synchronization. In an exemplary embodiment of the present invention, however, the portable device extracts the source files from the compressed content file in the upload/download process and performs upload/download and management unit of source file.

Figure 5:
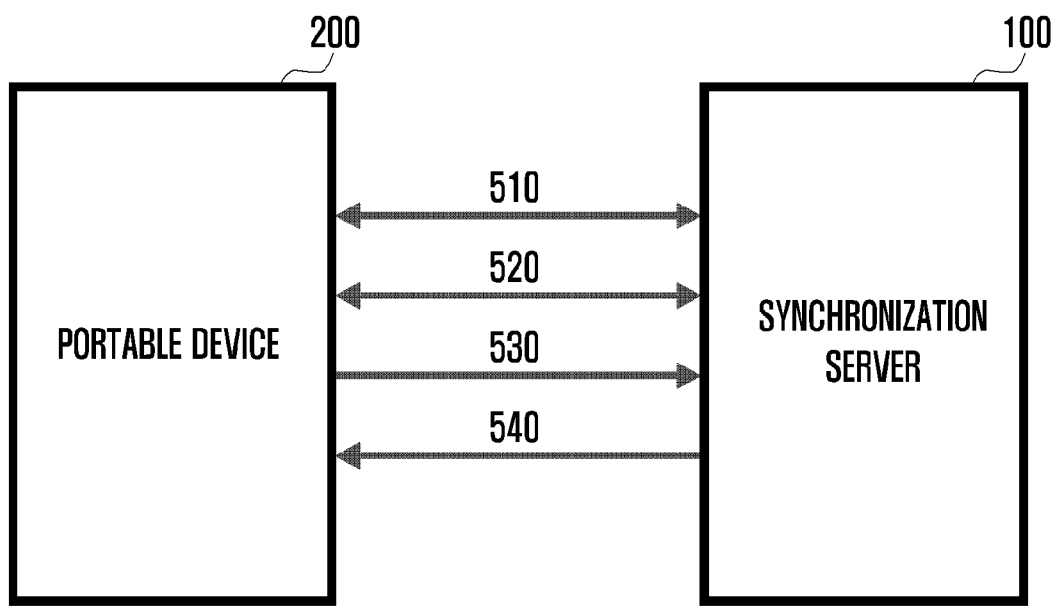
FIG. 5 is a schematic diagram illustrating a synchronization between a portable device and a synchronization server according to an exemplary embodiment of the present invention.

FIG. 5 is a schematic diagram illustrating a synchronization between a portable device and a synchronization server according to an exemplary embodiment of the present invention.

Referring to FIG. 5, the portable device 200 and the synchronization server 100 compare their compressed content file information to determine if any modification has occurred in the compressed content file at step 510. Here, the portable device 200 and the synchronization server 100 check the information on the compressed content file (e.g., snb file) to retrieve the modified snb file. Although the description is directed to the case that the modification of the compressed content file can be determined based on the time stamp, the present invention is not limited thereto. At this time, the portable device 200 and the synchronization server 100 can determine the file name of the modified compressed content file.

The portable device 200 and the synchronization server 100 are capable of determining the modified compressed content file and tracing the modification histories of the source files of the compressed content file to determine the modified source files at step 520. At this time, the portable device 200 and the synchronization server 100 are capable of determining the modification of the source files based on the comparison between the local source file information and the server source file information or using checksum information. However, it is to be understood that these are merely examples and that the invention is not limited thereto. In the case that there is no source file information on the compressed content file, the portable device 200 is capable of decompressing the compressed content file to determine the modification based on the source file information of the decompressed source files.

If it is determined that there is modification in any of the source files stored in the portable device 200, the portable device 200 decompresses the compressed content file to extract the modified source files and source file information thereof at step 530.

The portable device 200 is capable of uploading the extracted source files and source file information to the synchronization server 100. The synchronization server 100 is capable of updating the corresponding server source files and server source file information with the source files and source file information transmitted by the portable device 200. That is, the synchronization server 100 is capable of updating the compressed content file by updating the source files with the modified source files transmitted by the portable device 200.

In the case that some of the source files are modified in the synchronization server 100, the portable device 200 is capable of downloading the modified source file from the synchronization server 100 at step 540. The portable device 200 is capable of decompressing the compressed content file to update the local source files with the downloaded source files and recompress the updated source files into the compressed content file. In this way, the portable device 200 is capable of synchronizing the compressed content files by replacing only the modified source files other than the whole compressed content file.

Figure 6:
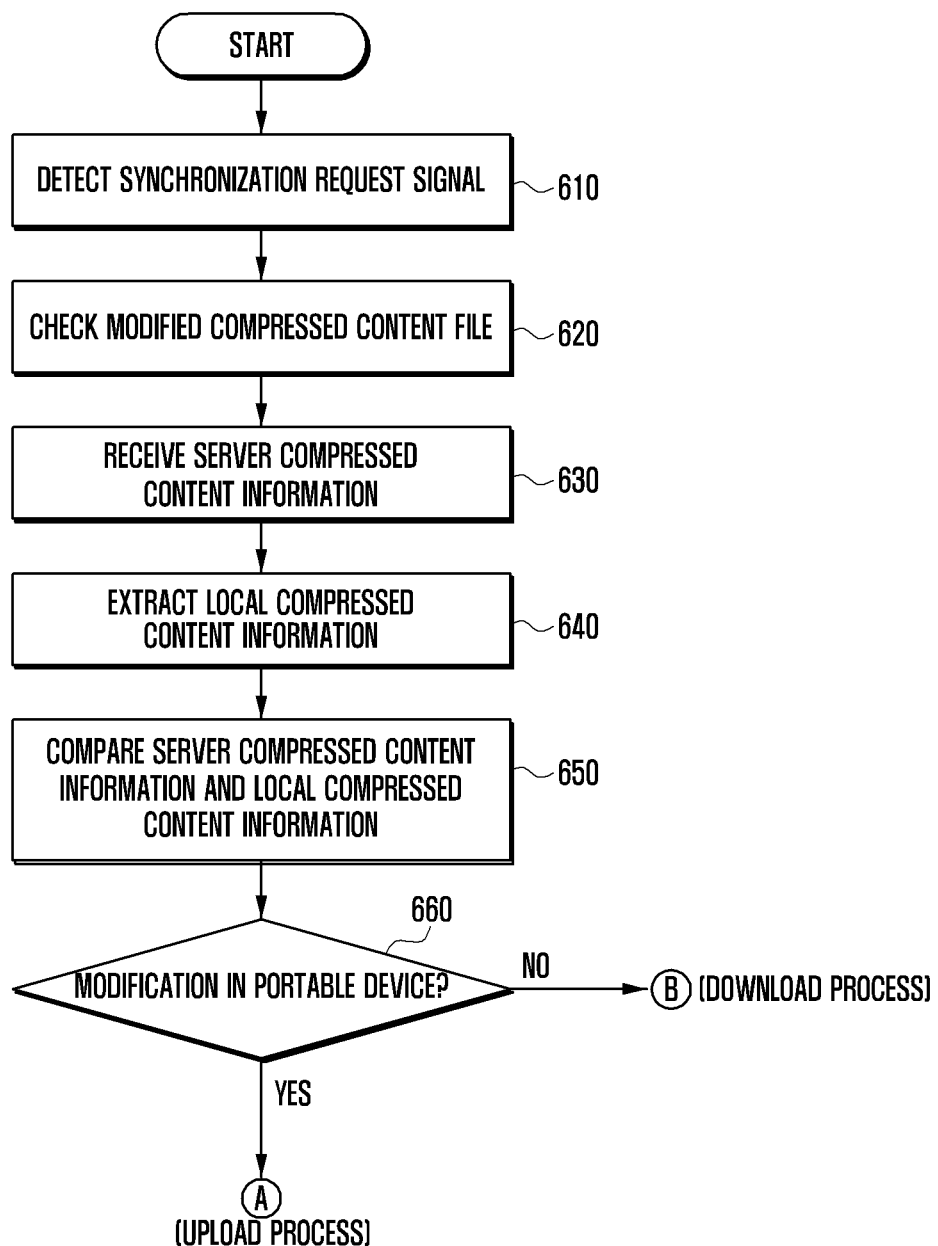
FIG. 6 is a flowchart illustrating a compressed content file synchronization method according to an exemplary embodiment of the present invention.

FIG. 6 is a flowchart illustrating a compressed content file synchronization method according to an exemplary embodiment of the present invention.

Referring to FIG. 6, the control unit 250 detects a synchronization request signal at step 610. In the case that a compressed content file is created, modified, or deleted in the portable device or a message notifying of creation, modification, or deletion of a compressed content file is received from the server, the control unit 250 is capable of determining that the modification request signal is generated. Although the description is directed to the case where the control unit 250 configures a synchronization period for performing synchronization at the synchronization period, the present invention is not limited thereto.

Although exemplary embodiments of the present invention are directed to a case where the synchronization request signal is generated when the portable device or the synchronization server detects data modification through periodic data modification information determination, the synchronization request signal can be generated by the user.

If a synchronization request signal is detected, the control unit 250 checks the modified compressed content file between the portable device and the synchronization server at step 620. Although the description is directed to the case where the control unit 250 checks the modified compressed content file based on the time stamp of the compressed content file, the present invention is not limited thereto. At this time, the control unit is capable of checking the list of the modified compressed content files from the server. The control unit 250 is also capable of checking the modified compressed content files by acquiring the lists of the time stamps of the compressed content files and compressing the time stamp list stored in the synchronization server and the compressed content file list stored in the portable device.

The control unit 250 receives the compressed content file information on the modified compressed content files from the synchronization server at step 630. At this time, the control unit 250 is also capable of receiving the source file information of the source files constituting the modified compressed content files. The control unit 250 extracts the local compressed content file information stored in association with the modified compressed content file at step 640.

The control unit 250 compares the local compressed content file information and the server compressed content file information at step 650. The control unit 250 determines whether the modified compressed content file is of being uploaded or downloaded at step 660. In more detail, the control unit 250 is capable of determining whether the compressed content file is modified in the portable device or the synchronization server.

If the compressed content file is modified in the portable device, the control unit 250 determines that the modified compressed content file is being uploaded and performs upload process (A) to the synchronization server.

If the compressed content file is modified in the synchronization server, the control unit 250 determines that the modified compressed content file is being downloaded and performs download process (B) with the synchronization server. The upload process is described with reference to FIG. 7, and the download process is described with reference to FIG. 8.

Figure 7:
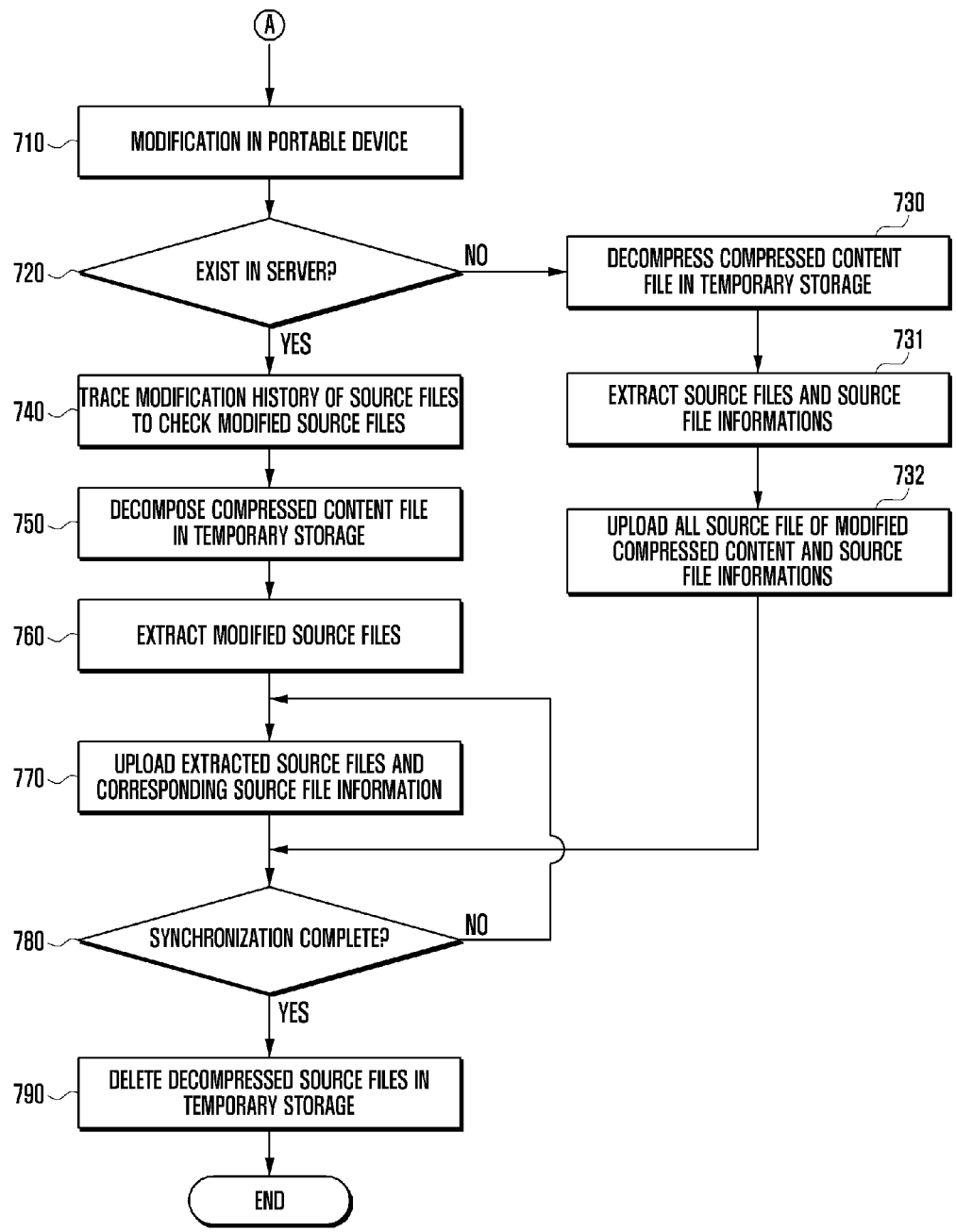
FIG. 7 is a flowchart illustrating an upload process of a compressed content file synchronization method according to an exemplary embodiment of the present invention.

FIG. 7 is a flowchart illustrating an upload process of a compressed content file synchronization method according to an exemplary embodiment of the present invention.

Referring to FIG. 7, the control unit checks the compressed content file modified in the portable device at step 710. The control unit 250 is capable of determining whether the compressed content file, identical with the modified compressed content file, is stored in the synchronization server. At step 720, the control unit 250 determines whether the corresponding compressed content file is stored in the synchronization server based on the compressed content file information (e.g., compressed content file name, unique ID, file identification degree, etc.). Of course, the present invention is not limited thereto.

If it is determined that there is no corresponding compressed content file in the synchronization server at step 720, the control unit 250 decompresses the modified compressed content file in a temporary storage to extract the individual source files constituting the compressed content file at step 730. The control unit 250 generates the source file information on individual source files at step 731 and uploads all the source files and the source file information to the synchronization server at step 732. Once the compressed content file has been uploaded completely at step 732, the procedure goes to step 780.

If it is determined that there is the corresponding compressed content file in the synchronization server at step 720, the control unit 250 traces the modification histories of the individual source files of the modified compressed content file to check the modified source files at step 740. At this time, the control unit 250 is capable of checking the modified source files using a checksum algorithm. However, the present invention is not limited thereto.

The control unit 250 decompresses the compressed content file in the temporary storage at step 750, extracts the modified source files at step 760, and uploads the extracted source files and the source file information for synchronization at step 770. The control unit 250 determines whether the synchronization has been completed at step 780. If the synchronization has been completed, the control unit 250 deletes the decompressed source files in the temporary storage at step 790. If the synchronization has not been completed, the procedure returns to step 770.

Figure 8:
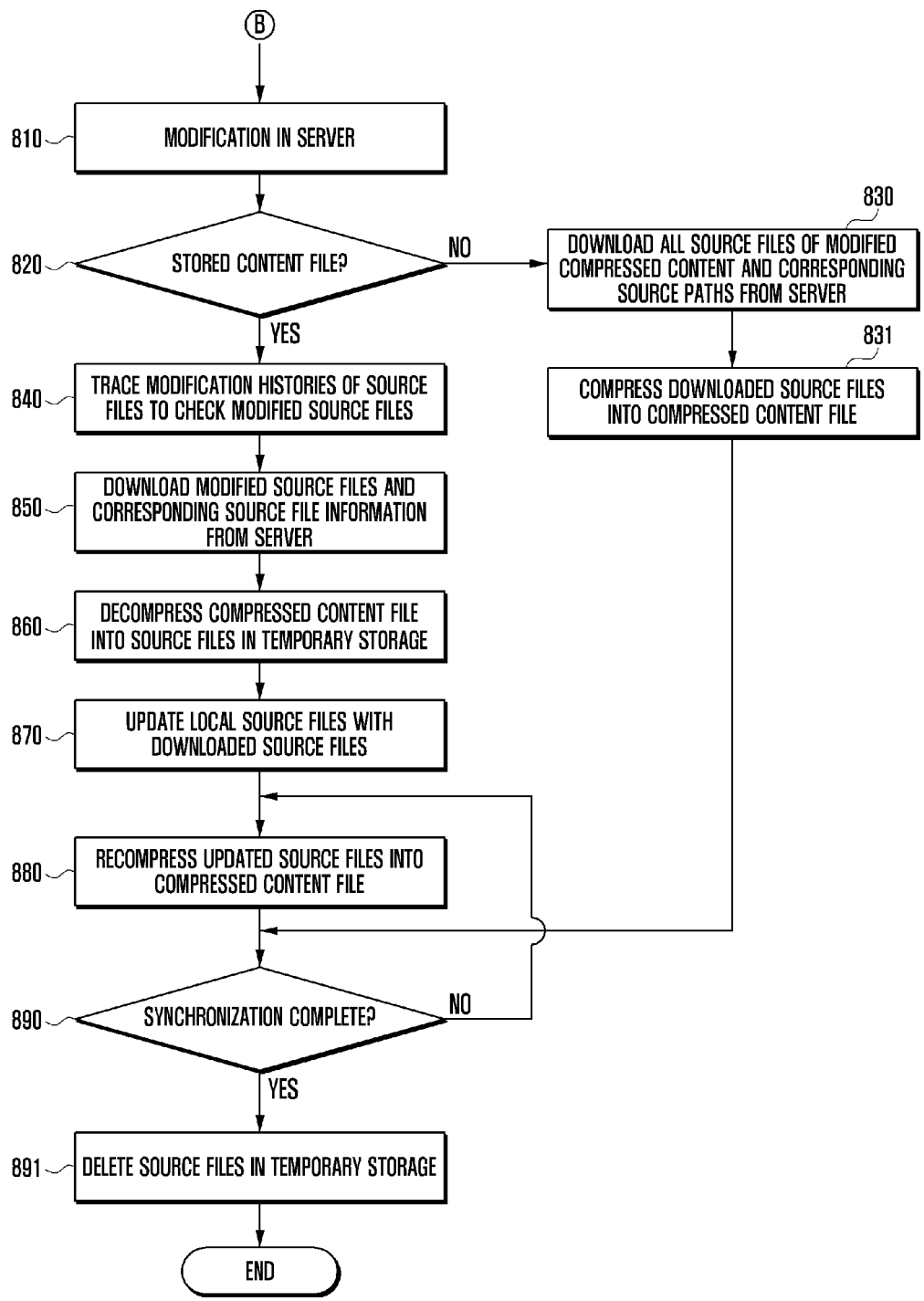
FIG. 8 is a flowchart illustrating a download process of a compressed content file synchronization method according to an exemplary embodiment of the present invention.

FIG. 8 is a flowchart illustrating a download process of a compressed content file synchronization method according to an exemplary embodiment of the present invention.

Referring to FIG. 8, the control unit 250 checks modification of a compressed content file in the synchronization server at step 810. The control unit 250 determines whether the compressed content file corresponding to the modified compressed content file exists in the storage unit at step 820. At this time, the control unit 250 is capable of checking the modified compressed content file based on the compressed content file information (e.g., compressed content file name and file identification information) but the present invention is not limited thereto.

If there is no modified compressed content file in the storage unit, the control unit 250 downloads all the source files and source file path information related to the modified content file from the synchronization server at step 830. The control unit 250 is capable of generating the compressed content file by compressing all the downloaded source files at step 831. Here, the newly generated file can be used as one compressed content file in the portable device. Once the compressed content file has been generated, the procedure goes to step 890.

If there is the modified compressed content file in the storage unit, the control unit 250 traces the modification histories of the individual source files constituting the modified compressed content file to check the modified source file at step 840. At this time, the control unit 250 is capable of receiving a list of the modified source files from the synchronization server. The control unit 250 is also capable of receiving the server source file information and compares the received source file information with the local source file information to check the modified source file. However, the present invention is not limited thereto.

The control unit 250 controls to download only the modified source files and the corresponding source file information at step 850 and decompresses the compressed content file in the temporary storage at step 860. The control unit 250 updates the corresponding local source files among the local source files decompressed from the compressed content file with the downloaded server source files at step 870. The control unit 250 recompresses the local source files including the updated source files into the compressed content file at step 880 so as to match the compressed content file modified in the server.

The control unit 250 determines whether the synchronization has completed at step 890. If the synchronization has completed, the control unit 250 deletes the decompressed source files in the temporary storage at step 891. If the synchronization has not completed, the procedure returns to step 880.

FIG. 9 is a diagram illustrating tables summarizing source file information and compressed content file information for use in a portable device according to an exemplary embodiment of the present invention.

Referring to FIG. 9, the compressed content file information and source file information stored in the portable device and the synchronization server are formatted as follows.

In an exemplary embodiment of the present invention, the portable device and the synchronization server are capable of storing the compressed content file information and the source file information in association with a compressed content file. The compressed content file information can be formatted as shown in part 901 of FIG. 9. The compressed content file information is capable of including a file ID 910, a file storage path 911, a file name 912, and a unique synchronization identification key 913. Of course, the present invention is not limited thereto. The portable device and the synchronization server are capable of tracing the modification histories of the individual source files to check the modified source files using the checksum algorithm.

For example, it may be assumed that there is a compressed content file of 'magazine.snb'. The compressed content file has the file ID of '1', the file name of 'magazine', and a unique key for synchronization. The compressed content file information of the compressed content file 'magazine.snb' includes the file ID '1' and storage paths of the source files constituting the corresponding compressed content file. As shown in part 902 of FIG. 9, the information of the source files constituting the corresponding compressed content file include an snb_id 920, a file storage path 921, and a checksum identifier 922.

FIG. 10 is a diagram illustrating a table summarizing source file information of source files stored in a synchronization server according to an exemplary embodiment of the present invention.

Referring to FIG. 10, the source files stored in the synchronization server can be stored in a directory format. In the synchronization process, the synchronization server according to an exemplary embodiment of the present invention stores the source files constituting the compressed content file other than the compressed content file in itself in a directory format according to the storage path based on the source information.

For example, if the compressed content file 'magazine.snb' is uploaded, the individual source files constituting the magazine.snb rather than the whole compressed content file in itself. The synchronization server generates a unique key (e.g., unique_key) and the first path directory 1010 with the unique key. Next, the synchronization server generates the secondary directory 1020 in the first path directory 1010 and the third direction 1030 in the second path directory 1020 such that the source files are stored in the decompressed station according to the path information. The synchronization server also generates the checksum information 1040.

As described above, an exemplary synchronization method of the present invention is capable of synchronizing the compressed content file in units of source file, the compressed content file consisting of source files.

Also, an exemplary synchronization method of the present invention is capable of tracing, when modification is detected in a compressed content file, the modification histories of the individual source files constituting the compressed content file, and updating only the modified source files rather than the whole compressed content file for synchronization of the compressed content file, resulting in reduction of network resource waste and synchronization latency.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable device for synchronizing a compressed content file containing multiple source files, the device comprising:
   a radio frequency transceiver configured to connect to the synchronization server to transmit and receive data related to the compressed content file;
   a memory configured to store at least one of the compressed content file, a local compressed content file information, and source file information related to local source files constituting the compressed content file; and
   a processor configured to:
   detect a synchronization request signal generated by an event modifying the compressed content file,
   extract at least one modified first source file from the compressed content file based on the source file information,
   receive a server compressed content file information from the synchronization server,
   determine whether the compressed content file is modified in the portable device or the synchronization server based on the local compressed content file information and the server compressed content file information, and
   synchronize the extracted first source file with a second source file matching among source files stored in a synchronization server.

2. The device of claim 1,
   wherein the local compressed content file information comprises at least one of a compressed content file time stamp, a file name, a file identifier, and a unique synchronization key, and
   wherein the source file information of each source file further comprises at least one of a compressed content file identifier and a source file path.

3. The device of claim 2, wherein the processor is further configured to:
   control uploading of the first source files to the synchronization server when the compressed content file is modified in the portable device and downloading only the second source files from the synchronization server when the compressed content file is modified in the synchronization server.

4. The device of claim 3, wherein the processor is further configured to:
   decompress the compressed content file into the source files in upload synchronization,
   extract the modified first source files among the decompressed source files, and
   delete, when the synchronization completes, the decompressed source files in a temporary storage.

5. The device of claim 3, wherein the processor is further configured to:
   control downloading of the modified second source files and source file information related to the modified second source files from the synchronization server,
   decompress the compressed content file into the source files in a temporary storage, update modified second source files among the decompressed source files,
   recompress the source files including the updated source files into the compressed content file, and
   delete the second source files from the temporary storage.

6. The device of claim 1, wherein the processor is further configured to extract the at least one modified source file using a checksum method.

7. A synchronization method of a portable device for synchronizing a compressed content file, the method comprising:
   detecting a synchronization request signal generated by an event modifying the compressed content file;
   extracting at least one modified first source file based on source file information related to local source files constituting the compressed content file in response to the synchronization request signal;
   receiving a server compressed content file information,
   determining whether the compressed content file is modified in the portable device or another device based on a local compressed content file information and the server compressed content file information; and
   synchronizing the extracted first source file with a second source file matching among source files stored in a synchronization server.

8. The method of claim 7, wherein the determining of whether the compressed content file is modified in the portable device or the other device comprises:
   comparing the local compressed content file information with the server compressed content file information;
   determining a modified compressed content file based on the comparison result; and
   determining whether the modified compressed content file is being uploaded or downloaded.

9. The method of claim 7, wherein the extracting of the at least one modified source file comprises:
   decompressing the modified compressed content file into the source files in a temporary storage;

extracting the modified first source files among the decompressed source files; and deleting, when the synchronization completes after the extracting of the modified first source files, the decompressed source files in the temporary storage.

10. The method of claim 8, wherein the determining of whether the modified compressed content file is being uploaded or downloaded comprises:

determining, when the modified compressed content file is being uploaded, whether the modified compressed content file exists in the synchronization server;

decompressing, when the modified compressed content file does not exist in the synchronization server, the modified compressed content file into the first source files and source file information related to the first source files in a temporary storage;

uploading all the decompressed source files and corresponding source file information to the synchronization server; and uploading, when the modified compressed content file exists in the synchronization server, only the modified first source files and source file information related to the first source files to the synchronization server.

11. The method of claim 8, wherein the determining of whether the modified compressed content file is being uploaded or downloaded comprises:

determining, when the modified compressed content file is being downloaded, whether the modified compressed content file exists in the memory;

downloading, when the modified compressed content file does not exist in the memory, all second source files constituting the compressed content file and source file information related to the second source files from the synchronization server;

compressing the downloaded second source files into a local compressed content file;

downloading, when the modified compressed content file exists in the memory, at least one modified second source file and source file information related to the second source file from the synchronization server;

decompressing the local compressed content file stored in the memory into the source files in a temporary storage;

updating the decompressed source files with the downloaded second source files; and recompressing the updated source files into the local compressed content file.

12. The method of claim 8, wherein the extracting of the at least one modified first source file comprises extracting the modified first source file using a checksum method.

13. The method of claim 8, wherein the local compressed content file information comprises at least one of a compressed content file stamp, a file name, a file identifier, and a unique synchronization key, and wherein the source file information of each source file comprises at least one of a compressed content file identifier and a source file path.

14. A synchronization system for synchronizing a compressed content file with a synchronization server, the system comprising:

a portable device configured to:
    store at least one of source files information related to local source files constituting a compressed content file,
    extract modified first source files from the compressed content file based on the source file information,
    receive a server compressed content file information,
    determine whether the compressed content file is modified in the portable device or by another device based on the server compressed content file information and a local compressed content file information, and
    synchronize the extracted first source file among the compressed content file by updating only the modified source files; and a synchronization server configured to:
    store at least one source file constituting the compressed content file and source file information related to the source file and the server compressed content file information,
    provide the device with a list of modified second source files information, and
    synchronize the compressed content file by updating only the modified second source files with the first files stored in the portable device.

15. The system of claim 14, wherein the local compressed content file information comprises at least one of a compressed content file time stamp, a file name, a file identifier, and a unique synchronization key, and wherein the source file information of each source file comprises at least one of a compressed content file identifier and a source file path.

16. The system of claim 14, wherein the portable device is further configured to extract the modified source file using a checksum method.

* * * * *